United States Patent
Wei et al.

(10) Patent No.: US 12,260,255 B2
(45) Date of Patent: Mar. 25, 2025

(54) INTELLIGENT PROCESS MANAGEMENT IN SERVERLESS WORKFLOW CLOUD ENVIRONMENTS

(71) Applicant: International Business Machines Corporation, Armonk, NY (US)

(72) Inventors: Jing Jing Wei, Beijing (CN); Yue Wang, Beijing (CN); Shu Jun Tang, Beijing (CN); Yang Kang, Beijing (CN); Yi Fan Wu, Beijing (CN); Qi Han Zheng, Beijing (CN); Jia Lin Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 17/936,435

(22) Filed: Sep. 29, 2022

(65) Prior Publication Data

US 2024/0111588 A1 Apr. 4, 2024

(51) Int. Cl.
  *G06F 3/00* (2006.01)
  *G06F 9/50* (2006.01)

(52) U.S. Cl.
  CPC .......... *G06F 9/5038* (2013.01); *G06F 9/5072* (2013.01); *G06F 2209/5019* (2013.01); *G06F 2209/505* (2013.01)

(58) Field of Classification Search
  CPC ....................................................... G06F 9/48
  See application file for complete search history.

(56) References Cited

U.S. PATENT DOCUMENTS

| | | | | |
|---|---|---|---|---|
| 5,974,439 A | * | 10/1999 | Bollella | G06F 9/4887 718/104 |
| 6,567,807 B1 | * | 5/2003 | Robles | G06Q 10/109 |
| 10,496,095 B1 | * | 12/2019 | Bays | G05D 1/0088 |
| 2007/0195789 A1 | * | 8/2007 | Yao | H04L 47/564 370/395.21 |

(Continued)

FOREIGN PATENT DOCUMENTS

| | | |
|---|---|---|
| CN | 113051075 A | 6/2021 |
| CN | 113448685 A | 9/2021 |

OTHER PUBLICATIONS

Amy R. Wolfson and Mary A. Carskadon, Sleep Schedules and Daytime Functioning in Adolescents. (Year: 1998).*

(Continued)

*Primary Examiner* — Lechi Truong
(74) *Attorney, Agent, or Firm* — Yee & Associates, P.C.

(57) ABSTRACT

Intelligent process management is provided. A start time is determined for an additional process to be run on a worker node within a duration of a sleep state of a task of a process already running on the worker node by adding a first defined buffer time to a determined start time of the sleep state of the task. A backfill time is determined for the additional process by subtracting a second defined buffer time from a determined end time of the sleep state of the task. A scheduling plan is generated for the additional process based on the start time and the backfill time corresponding to the additional process. The scheduling plan is executed to run the additional process on the worker node according to the start time and the backfill time corresponding to the additional process.

17 Claims, 14 Drawing Sheets

(56) References Cited

U.S. PATENT DOCUMENTS

| | | | |
|---|---|---|---|
| 2010/0013625 A1* | 1/2010 | Kouzan | H04M 11/04 340/508 |
| 2013/0326575 A1* | 12/2013 | Robillard | G11B 27/28 725/116 |
| 2021/0365290 A1 | 11/2021 | Zhang et al. | |
| 2021/0367868 A1 | 11/2021 | Chen | |
| 2022/0147388 A1 | 5/2022 | Mundra et al. | |
| 2022/0346007 A1* | 10/2022 | Alpert | H04W 52/0216 |

OTHER PUBLICATIONS

Rodriguez et al., "Containers Orchestration with Cost-Efficient Autoscaling in Cloud Computing Environments," avXiv, Dec. 2, 2018, 22 pages. https://arxiv.org/ftp/arxiv/papers/1812/1812.00300.pdf.

Hoseinyfarahabady, "A Model Predictive Controller for Contention-Aware Resource Allocation in Virtualized Data Centers," 2016 IEEE 24th International Symposium on Modeling, Analysis and Simulation of Computer and Telecommunication Systems (MASCOTS), Sep. 19-21, 2016, pp. 277-282. https://ieeexplore.ieee.org/document/7774590.

"Serverless Workflow Management System (WFMS)," serverlessworkflow/synapse, copyright 2022 GitHub, Inc., accessed Sep. 27, 2022, 9 pages. https://github.com/serverlessworkflow/synapse.

Kogito, "Kogito ergo automate," Cloud-Native Business Automation for Building Intelligent Applications, Backed By Battle-Tested Capabilities, copyright CC by 3.0, a Red Hat sponsored project, accessed Sep. 27, 2022, 5 pages. https://kogito.kie.org/.

Adzic Gojko Gojko@Neuri Co UK et al: "Serverless computing: economic and architectural impact", Proceedings of the 18th ACM/IFIP/USENIX Middleware Conference, ACMPUB27, New York, NY, USA, Aug. 21, 2017 (Aug. 21, 2017), pp. 884-889, XP058697784, DOI: 10.1145/3106237.3117767, ISBN: 978-1-4503-5525-4.

PCT International Search Report and Written Opinion, dated Oct. 18, 2023, regarding Application No. PCT/IB2023/058771, 14 pages.

Zijun Li et al: "Pagurus: Eliminating Cold Startup in Server less Computing with Inter-Action Container Sharing", arxiv.org, Cornell University Library, 201 Olin Library Cornell University Ithaca, NY 14853, Aug. 25, 2021 (Aug. 25, 2021), XP091039954.

* cited by examiner

| TASK NAME | IS SLEEP TASK | AVERAGE EXECUTION TIME | MAX EXECUTION TIME | MIN EXECUTION TIME |
|---|---|---|---|---|
| A1 | NO | 1 | 2 | 0.5 |
| A2 | NO | 5 | 7 | 4 |
| A3 | NO | 4 | 6 | 3 |

| TASK NAME | IS SLEEP TASK | AVERAGE EXECUTION TIME | MAX EXECUTION TIME | MIN EXECUTION TIME |
|---|---|---|---|---|
| B1 | NO | 3 | 4 | 2 |
| B2 | YES | 6 | 6 | 6 |
| B3 | NO | 1 | 2 | 0.5 |

| TASK NAME | IS SLEEP TASK | AVERAGE EXECUTION TIME | MAX EXECUTION TIME | MIN EXECUTION TIME |
|---|---|---|---|---|
| C1 | NO | 1 | 2 | 0.5 |
| C2 | NO | 3 | 5 | 2 |

| TASK NAME | IS SLEEP TASK | AVERAGE EXECUTION TIME | MAX EXECUTION TIME | MIN EXECUTION TIME |
|---|---|---|---|---|
| D1 | NO | 10 | 14 | 7 |

| TASK NAME | IS SLEEP TASK | AVERAGE EXECUTION TIME | MAX EXECUTION TIME | MIN EXECUTION TIME |
|---|---|---|---|---|
| E1 | NO | 4 | 5 | 3 |
| E2 | NO | 6 | 8 | 3 |

HISTORICAL PROCESS STATISTICS DATA
406

FIG. 4B

INTELLIGENT PROCESS MANAGEMENT IN SERVERLESS WORKFLOW CLOUD ENVIRONMENTS

BACKGROUND

1. Field

The disclosure relates generally to serverless workflows and more specifically to performing intelligent management of processes in a serverless workflow cloud environment when insufficient worker node resources exist to deploy an additional process on the serverless workflow cloud environment.

2. Description of the Related Art

Serverless computing is a cloud computing execution environment in which a cloud provider allocates machine resources on demand, managing the servers (e.g., worker nodes) on behalf of customers. However, serverless processes (e.g., applications) are not concerned with capacity planning, configuration, management, maintenance, fault tolerance, or scaling of containers, virtual machines, or physical servers. When a process is not in use, there are no computing resources allocated to that process.

Cloud Native Computing Foundation Serverless Workflow defines a vendor-neutral, open-source, and fully community-driven environment for defining and running domain specific language-based workflows that target serverless cloud technology. A serverless workflow defines a domain specific language that describes stateful and stateless workflow-based orchestrations of serverless processes (e.g., microservices). The scheduling mechanism of current serverless workflows on a cloud container orchestration environment, such as, for example, Kubernetes® (a registered trademark of the Linux Foundation of San Francisco, California), generates one pod with a single container for a process on every execution of every instance of a serverless workflow and then deletes the pod when the process enters a sleep state.

SUMMARY

According to one illustrative embodiment, a computer-implemented method for intelligent process management is provided. A computer determines a start time for an additional process to be run on a worker node within a duration of a sleep state of a task of a process already running on the worker node by adding a first defined buffer time to a determined start time of the sleep state of the task. The computer determines a backfill time for the additional process by subtracting a second defined buffer time from a determined end time of the sleep state of the task. The computer generates a scheduling plan for the additional process based on the start time and the backfill time corresponding to the additional process. The computer executes the scheduling plan to run the additional process on the worker node according to the start time and the backfill time corresponding to the additional process. According to other illustrative embodiments, a computer system and computer program product for intelligent process management are provided.

BRIEF DESCRIPTION OF THE DRAWINGS

FIGS. 4A-4B are diagrams illustrating an example of generating statistical data for a process in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
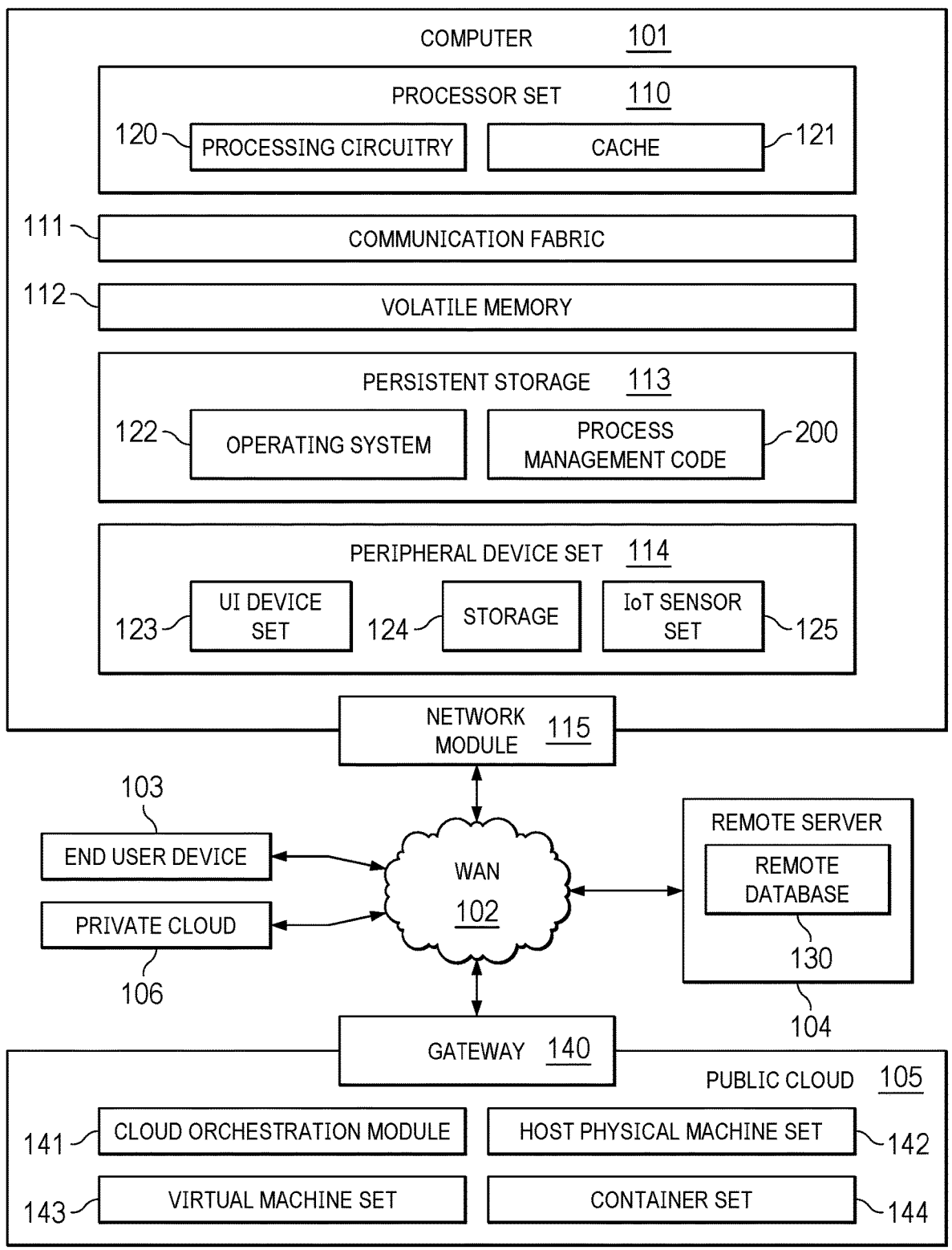
FIG. 1 is a pictorial representation of a computing environment in which illustrative embodiments may be implemented.
Figure 2:
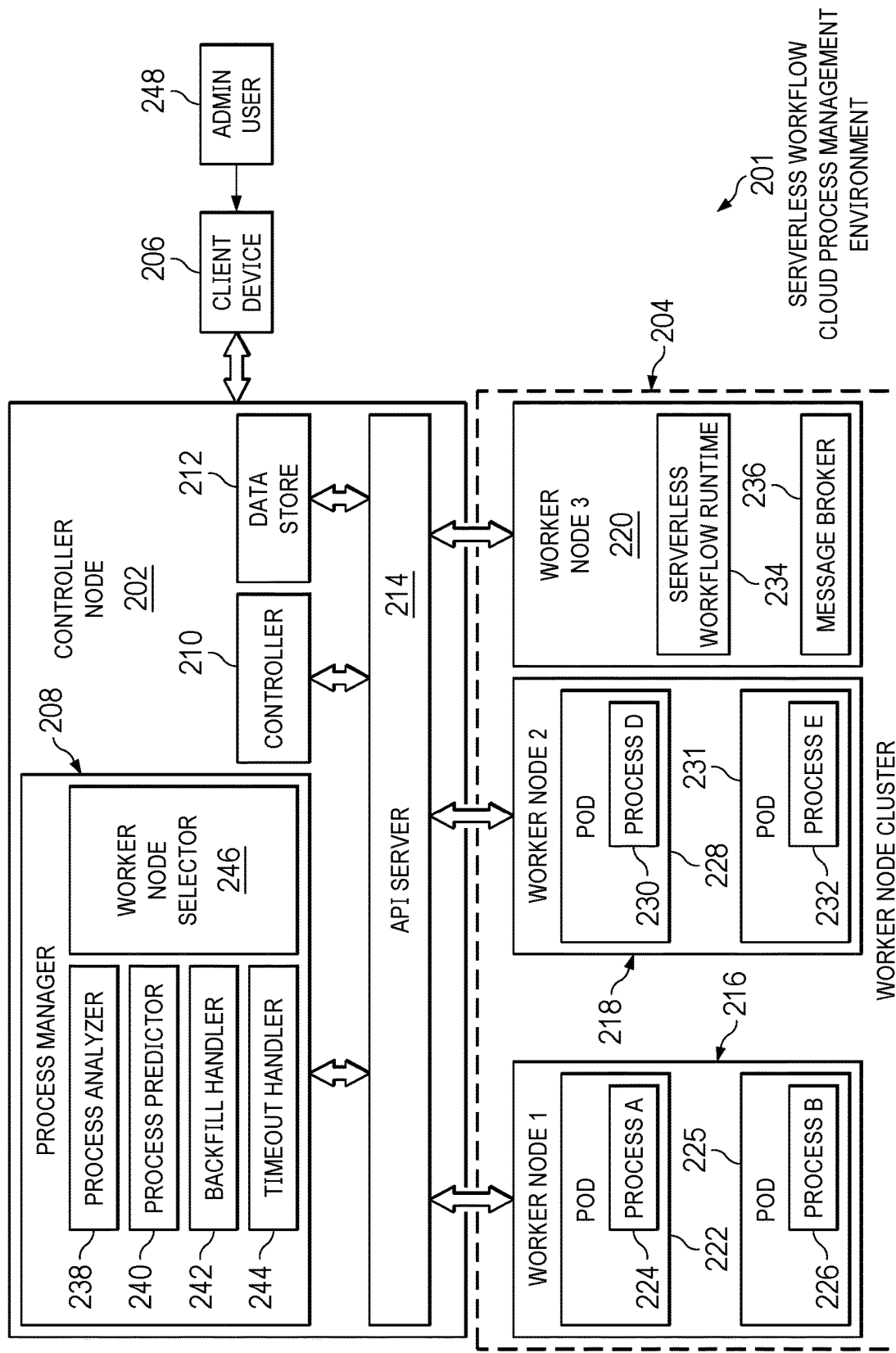
FIG. 2 is a diagram illustrating an example of a serverless workflow cloud process management environment in accordance with an illustrative embodiment.
Figure 3:
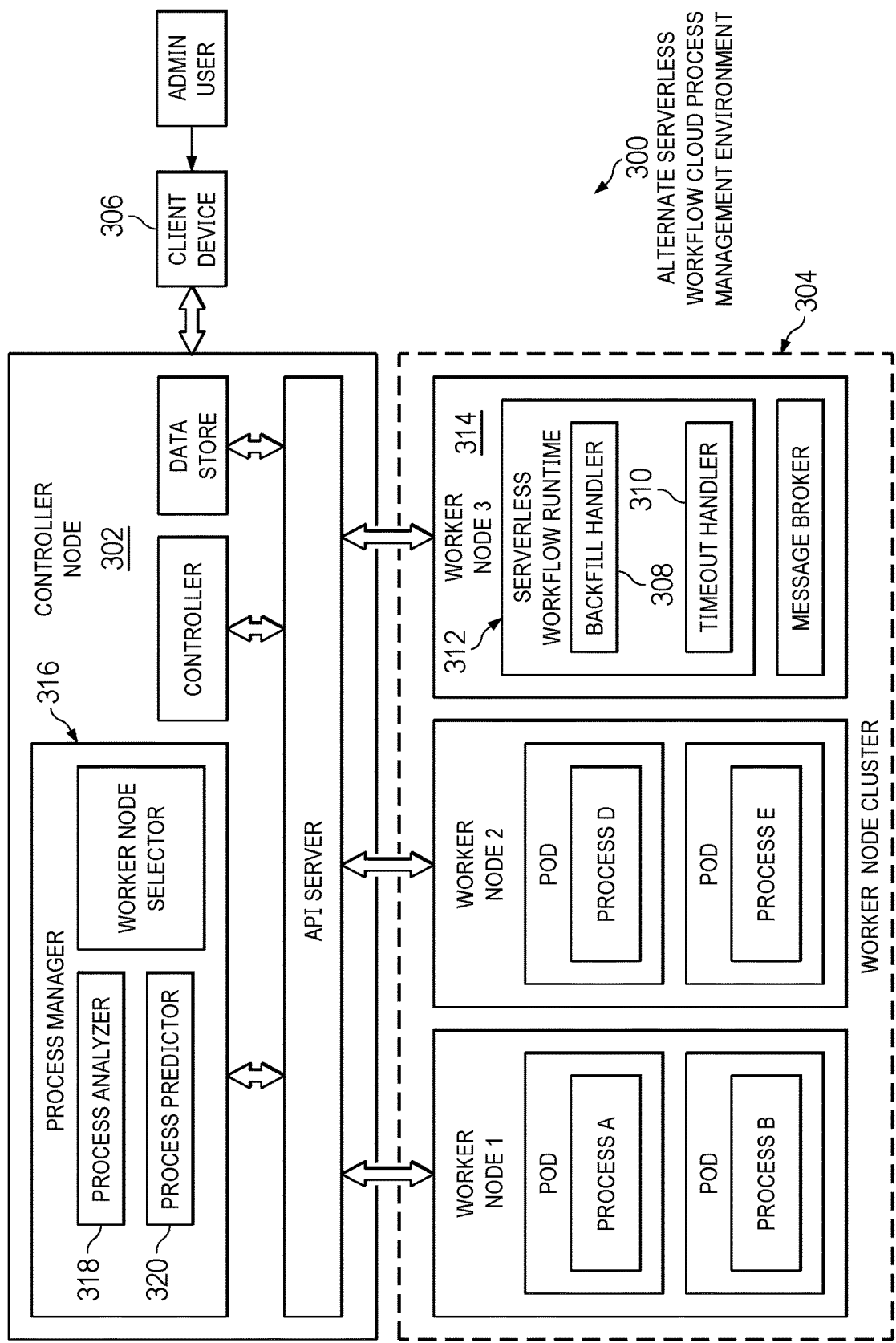
FIG. 3 is a diagram illustrating an example of an alternative serverless workflow cloud process management environment in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as process management code 200. For example, process management code 200 performs intelligent management of processes in a serverless workflow cloud environment when insufficient worker node resources exist to deploy an additional process on the serverless workflow cloud environment.

In addition to process management code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and process management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in process management code block 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The process management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC)

connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Currently, worker node resources on a serverless workflow cloud environment are available only when a process finishes its whole life-cycle. In addition, most processes do not use 100% of their allocated resources all the time. Further, current serverless workflow cloud container orchestration environments, such as, for example, Kubernetes, only schedule a process when sufficient worker node resources are available. Current serverless workflows know how many resources each process uses, but these current serverless workflows do not have the ability to schedule processes between worker nodes in a cluster when insufficient resources exist. For example, a process that includes a task with a sleep state during its life-cycle is running on a worker node in the cluster and a request is received to deploy an additional process, which is a short-running process, on the cluster of worker nodes. However, sufficient resources are currently unavailable to deploy the additional process on the cluster. As a result, these current serverless workflows fail the deployment of the additional short-running process directly for lack of available worker node resources.

Illustrative embodiments scale processes in a serverless workflow cloud environment. Illustrative embodiments schedule processes in an intelligent manner that efficiently leverages worker node cluster resources when long-running processes include specific time durations for sleep states of tasks. Illustrative embodiments schedule a short-running process to run on a same worker node in the cluster as another long-running process during the duration of a sleep state of a task of the long-running process even though insufficient worker node resources (e.g., CPU, memory, storage, network, and the like) in the cluster exist on the serverless workflow cloud environment to run both the short-running and long-running processes in the cluster of worker nodes at this time. Moreover, illustrative embodiments ensure that the long-running process that includes the task with the sleep state can resume without error after the short-running process ends or is stopped.

To ensure improved utilization of resources on the cluster of worker nodes in the serverless workflow cloud environment, illustrative embodiments add a plurality of different components, such as, for example, a process analyzer, a process predictor, a backfill hander, and a total timeout handler, to a controller node of the serverless workflow cloud environment. The process analyzer analyzes historical process execution data and generates process execution statistics data, such as, for example, minimum, average, and maximum execution times of each respective process, based on the analysis of the historical process execution data. The process predictor generates and executes a process scheduling plan for an additional process (e.g., a short-running process) to be deployed on the cluster of worker nodes. The backfill handler manages the additional process when the additional process is not finished running by the determined backfill time, which is prior to the task with the sleep state starting again. The total timeout handler marks deployment of the additional process as failed when the additional process is not scheduled and finished running within the total timeout time.

As a result, illustrative embodiments are capable of running more processes without needing additional worker node resources by utilizing the time during sleep states of process tasks, which is in contrast to current serverless workflows that merely try to meet new process capacity by provisioning more worker nodes in the cluster. Furthermore, illustrative embodiments ensure that the process, which includes the task with the sleep state, executes correctly by not allowing the additional process running on the same worker node to exceed the duration of the sleep state of that task.

Thus, illustrative embodiments provide one or more technical solutions that overcome a technical problem with deploying an additional process on a cluster of worker nodes when insufficient worker node resources exist at that time. As a result, these one or more technical solutions provide a technical effect and practical application in the field of serverless computing.

With reference now to FIG. 2, a diagram illustrating an example of a serverless workflow cloud process management environment is depicted in accordance with an illustrative embodiment. Serverless workflow cloud process management environment 201 may be implemented in a computing environment, such as computing environment 100 in FIG. 1. Serverless workflow cloud process management environment 201 is a system of hardware and software components for intelligently managing processes when insufficient worker node resources exist to deploy an additional process.

In this example, serverless workflow cloud process management environment 201 includes controller node 202, worker node cluster 204, and client device 206. Controller node 202, worker node cluster 204, and client device 206 may be, for example, computer 101, host physical machine set 142, and EUD 103, respectively, in FIG. 1. However, it should be noted that serverless workflow cloud process management environment 201 is intended as an example only and not as a limitation on illustrative embodiments. In other words, serverless workflow cloud process management environment 201 can include any number of controller nodes, worker node clusters, client devices, and other devices and components not shown.

Controller node 202 is a main controlling unit of a group of worker nodes (also known as host nodes, compute nodes, minions, and the like) comprising worker node cluster 204. Controller node 202 manages the cluster's workload and directs communication across the cluster. In this example, controller node 202 includes process manager 208, controller 210, data store 212, and application programming interface (API) server 214.

Process manager 208 may be implemented using process management code 200 in FIG. 1. Process manager 208 intelligently manages a plurality of processes running in worker node cluster 204. Controller 210 has a reconciliation loop that drives actual cluster state toward the desired cluster state, communicating with API server 214 to create, update, and delete the resources controller 210 manages, such as, for example, pods on worker nodes. If the cluster's actual state doesn't match the desired state, then controller 210 takes action to fix the problem. Data store 212 contains configuration data of the cluster, representing the overall and desired state of the cluster at any given time. API server 214 provides internal and external interfaces for controller node 210. API server 214 processes and validates resource availability requests and updates state of API objects in data store 212, thereby allowing users (e.g., customers, administrators, or the like) to configure workloads across worker nodes in worker node cluster 204.

In this example, worker node cluster 204 includes worker node 1 216, worker node 2 218, and worker node 3 220. A worker node is a machine, either physical or virtual, where containers (i.e., process workloads) are deployed. A pod includes a container and a specification for how to run the container. The worker node hosts the pod, which includes the components of the process workload. However, it should be noted that worker node cluster 204 is intended as an example only and may include any number of worker nodes, pods, and processes.

Worker node 1 216 includes pod 222, which contains process A 224, and pod 235, which contains process B 226. Worker node 2 218 includes pod 228, which contains process D 230, and pod 231, which contains process E 232. Process A 224, process B 226, process D 230, and process E 232 may represent any type of process workload for performing any set of tasks. Worker node 3 220 includes serverless workflow runtime 234 and message broker 236. Serverless workflow runtime 234 collects runtime information from process A 224, process B 226, process D 230, and process E 232 and sends the runtime information to API server 214, which API server 214 in turn shares with process manager 208. Message broker 236 sends and receives messages between worker node 1 216 and worker node 2 218.

In this example, process manager 208 includes process analyzer 238, process predictor 240, backfill handler 242, timeout handler 244, and worker node selector 246. However, it should be noted that process manager 208 may include more or fewer components than shown. For example, a component of process manager 208 may be divided into two or more components, two or more components may be combined into one component, one or more components not shown may be added, or the like.

Process manager 208 utilizes process analyzer 238 to analyze the serverless workflow models of all processes that have previously run on serverless workflow cloud process management environment 201. Process analyzer 238 then generates sleep state information corresponding to one or more process tasks (e.g., identification of tasks having a sleep state and the time duration of each respective sleep state) based on the analysis of the information contained in a serverless workflow model of a corresponding process. A serverless workflow model is composed of a plurality of different definitions, such as, for example, function definitions, event definitions, retry definitions, timeout definitions, error definitions, state definitions, and the like. Function definitions are for reusable functions that can declare processes that need to be invoked, or expressions to be evaluated. Event definitions are reusable declarations of events that need to be consumed to start or continue workflow instances, trigger function or process execution, or be produced during workflow execution. Retry definitions are reusable retry definitions that can specify retry strategies for process invocations during workflow execution. Timeout definitions are reusable timeout definitions that can specify default workflow execution timeout, as well as workflow state, action, and branch execution timeouts. Errors definition are reusable error definitions that provide domain-specific error definitions, which can be referenced in workflow states error handling. State definitions are definitions of different states, such as, a sleep state, that are workflow control flow logic. States can reference the reusable function, event, and retry definitions. Sleep process execution is for a specific time duration. Thus, a process runs in serverless workflow cloud process management environment 201 in accordance with the process's corresponding serverless workflow model.

In addition, process manager 208 utilizes process analyzer 238 to analyze historical process execution data. Process analyzer 238 generates process execution statistics data, such as, for example, minimum, average, and maximum execution times, for process tasks that do not have a sleep state based on the analysis of the historical process execution data. It should be noted that process analyzer 238 collects process execution data from all running processes on a defined time interval basis. Also, process analyzer 238 determines which particular processes include a task with a sleep state and the duration of the sleep state based on analyzing the serverless workflow models of those particular processes.

Administrative user 248 utilizes client device 206 to send a request to controller node 202 to deploy an additional process (e.g., short-running process C) on worker node cluster 204 at a time when sufficient resources (e.g., CPU, memory, and the like) are not available to run the additional process on worker node cluster 204.

Process manager 208 utilizes process predictor 240 to generate and execute a scheduling plan for the additional process (e.g., short-running process C) to be deployed on worker node cluster 204. Process manager 208 utilizes backfill handler 242 to manage the additional process when the additional process is not finished running by a determined backfill time, which is prior to the process that includes the task with the sleep state waking up and starting again. If the additional process is not finished running by the determined backfill time, then backfill handler 242 stops the additional process at the determined backfill time to release the worker node resources used by the additional process and enable the process that includes the task with the sleep state to wake up and continue running once again without error.

Process manager 208 utilizes timeout handler 244 to mark deployment of the additional process as failed when the additional process is not scheduled and finished running within a total timeout time. Administrative user 248 or another user defines the total timeout time based on, for example, user need. Process manager 208 utilizes worker node selector 246 to identify a target worker node in worker node cluster 204 to run the additional process based on the worker node currently running a process that includes a task with a sleep state.

With reference now to FIG. 3, a diagram illustrating an example of an alternative serverless workflow cloud process management environment is depicted in accordance with an illustrative embodiment. Alternative serverless workflow cloud process management environment 300 may be implemented in a computing environment, such as computing environment 100 in FIG. 1.

In this example, alternative serverless workflow cloud process management environment 300 includes controller node 302, worker node cluster 304, and client device 306, such as, for example, controller node 202, worker node cluster 204, and client device 206 in FIG. 2. Thus, alternative serverless workflow cloud process management environment 300 is similar to serverless workflow cloud process management environment 201 in FIG. 2. However, it should be noted that alternative serverless workflow cloud process management environment 300 includes backfill handler 308 and timeout handler 310 in serverless workflow runtime 312 of worker node 3 314 instead of process manager 316. Process manager 316 is similar to process manager 208 in FIG. 2, except process manager 316 only includes process analyzer 318 and process predictor 320.

Figure 4A:
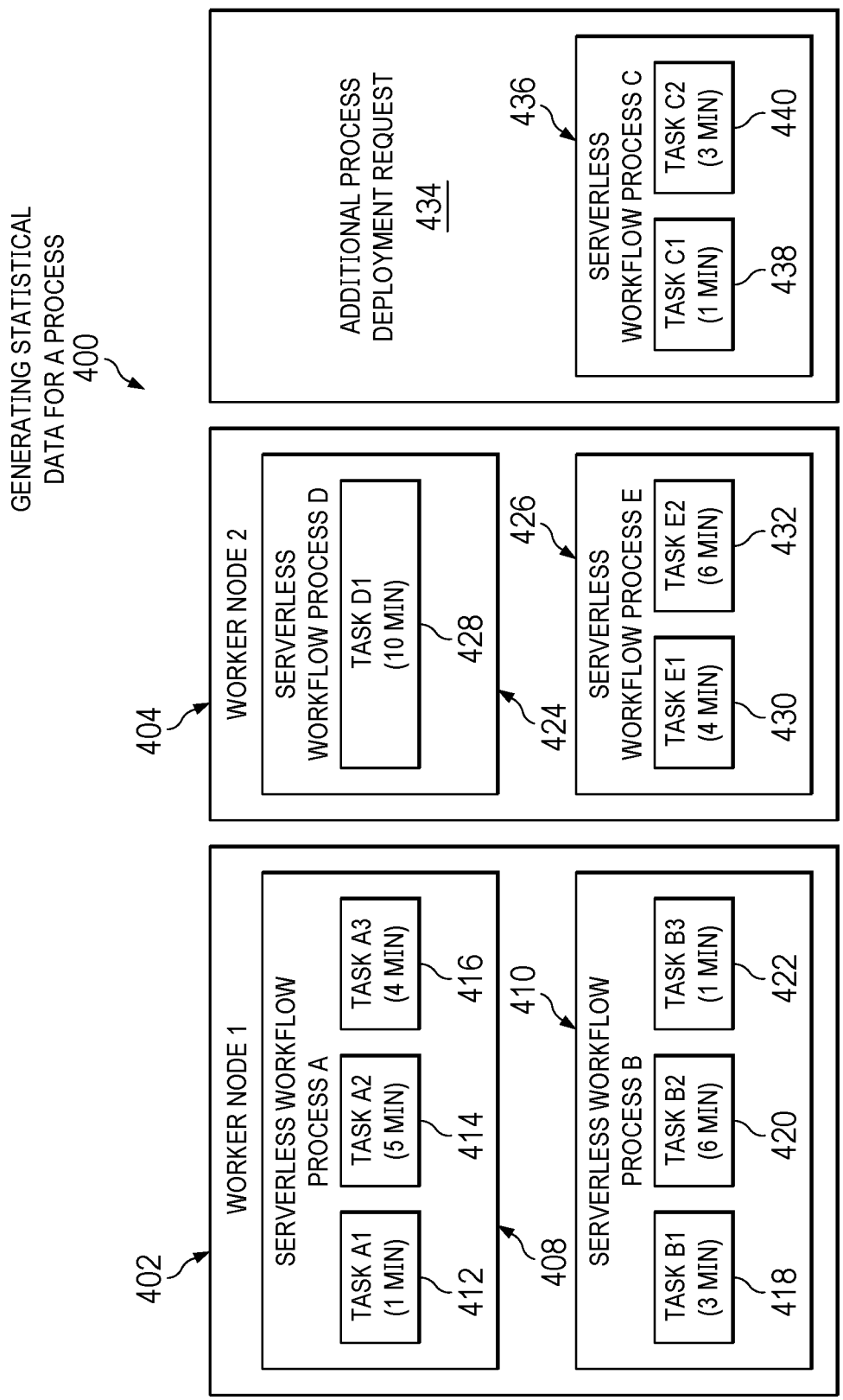

With reference now to FIGS. 4A-4B, diagrams illustrating an example of generating statistical data for a process is depicted in accordance with an illustrative embodiment. Generating statistical data for a process 400 may be implemented in a serverless workflow cloud process management environment, such as, for example, serverless workflow cloud process management environment 201 in FIG. 2.

In this example, generating statistical data for a process 400 includes worker node 1 402, worker node 2 404, and historical process statistics data 406. It should be noted that illustrative embodiments utilize a process analyzer, such as, for example, process analyzer 238 in FIG. 2, to generate historical process statistics data 406 by analyzing process execution data corresponding to all processes that have previously run on the serverless workflow cloud process management environment.

Worker node 1 402 and worker node 2 404 may be, for example, worker node 1 216 and worker node 2 218 in FIG. 2. Worker node 1 402 includes process A 408 and process B 410, such as, for example, process A 224 and process B 226 in FIG. 2. Process A 408 includes task A1 412, task A2 414, and task A3 416. Process B 410 includes task B1 418, task B2 420, and task B3 422. Task A1 412, task A2 414, and task A3 416 are not sleep tasks and the average execution time of task A1 412, task A2 414, and task A3 416 is 1 minute, 5 minutes, and 4 minutes, respectively, according to historical process statistics data 406. Thus, the overall average execution time of process A 408 is 10 minutes. Also, task B1 418 is not a sleep task, task B2 420 is a sleep task, and task B3 422 is not a sleep task with average execution times of 3 minutes, 6 minutes, and 1 minute, respectively, according to historical process statistics data 406. Thus, the overall average execution time of process B 410 is 10 minutes. It should be noted that illustrative embodiments utilize the process analyzer to determine that task B2 420 is a sleep task and its exact time duration (i.e., 6 minutes, which the process analyzer indicates is the minimum, average, and maximum execution times in historical process statistics data 406) by analyzing the serverless workflow model corresponding to process B 410.

Worker node 2 404 includes process D 424 and process E 426, such as, for example, process D 230 and process E 232 in FIG. 2. Process D 424 includes task D1 428. Process E 426 includes task E1 430 and task E2 432. Task D1 428 is not a sleep task and the average execution time of task D1 428 is 10 minutes according to historical process statistics data 406. Thus, the overall average execution time of process D 424 is 10 minutes. Also, task E1 430 and task E2 432 are not sleep tasks and the average execution time of task E1 430 and task E2 432 is 4 minutes and 6 minutes, respectively, according to historical process statistics data 406. Thus, the overall average execution time of process E 426 is 10 minutes.

A user, such as, for example, administrative user 248 in FIG. 2, submits additional process deployment request 434 for process C 436 to a controller node using a client device, such as, for example, controller node 202 and client device 206 in FIG. 2. Process C 436 includes task C1 438 and task C2 440. Task C1 438 and task C2 440 are not sleep tasks and the average execution time of task C1 438 and task C2 440 is 1 minute and 3 minutes, respectively, according to historical process statistics data 406. Thus, the overall average execution time of process C 436 is 4 minutes.

Figure 5A:
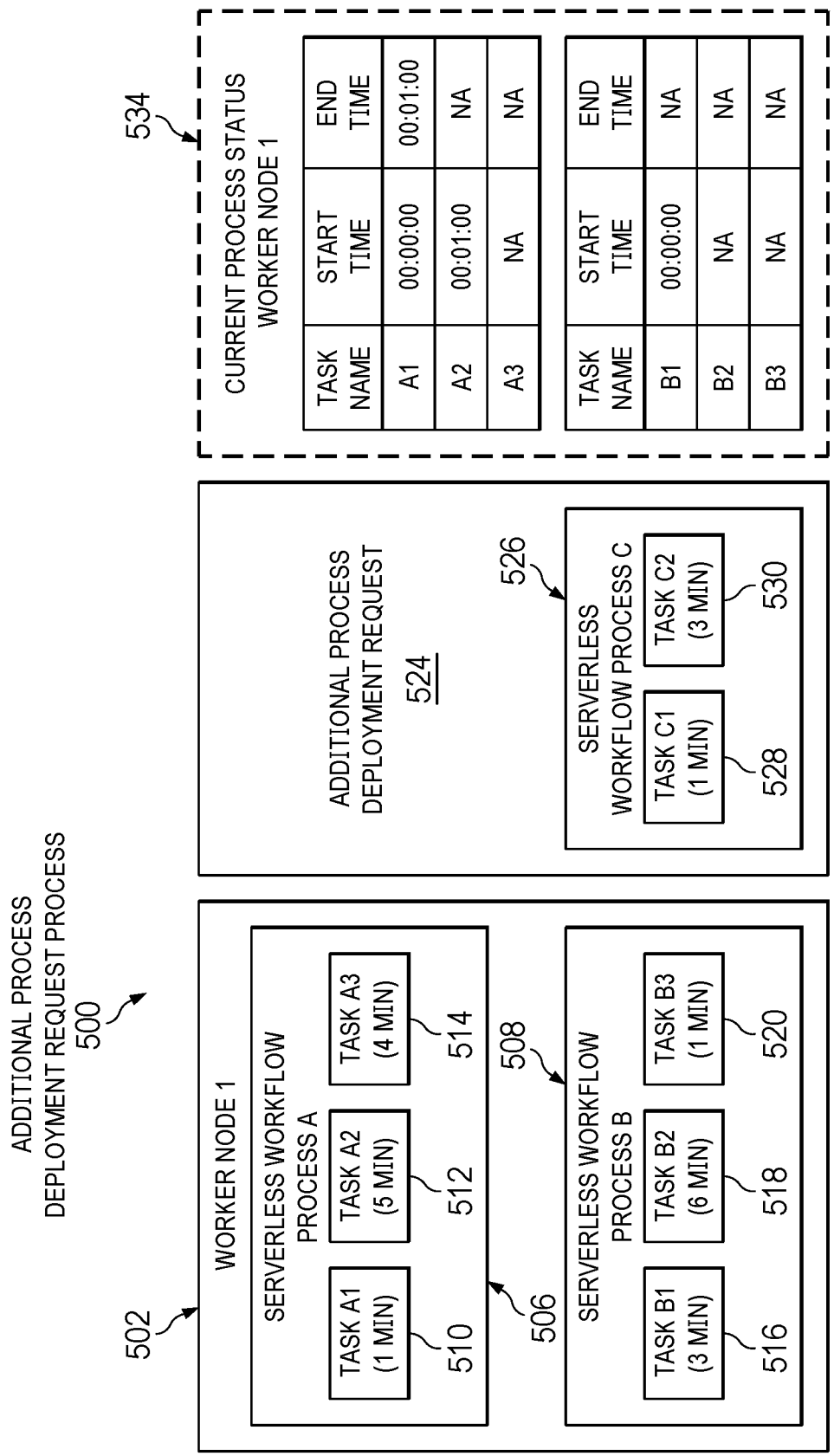
FIGS. 5A-5B are diagrams illustrating an example of an additional process deployment request process in accordance with an illustrative embodiment.
Figure 5B:
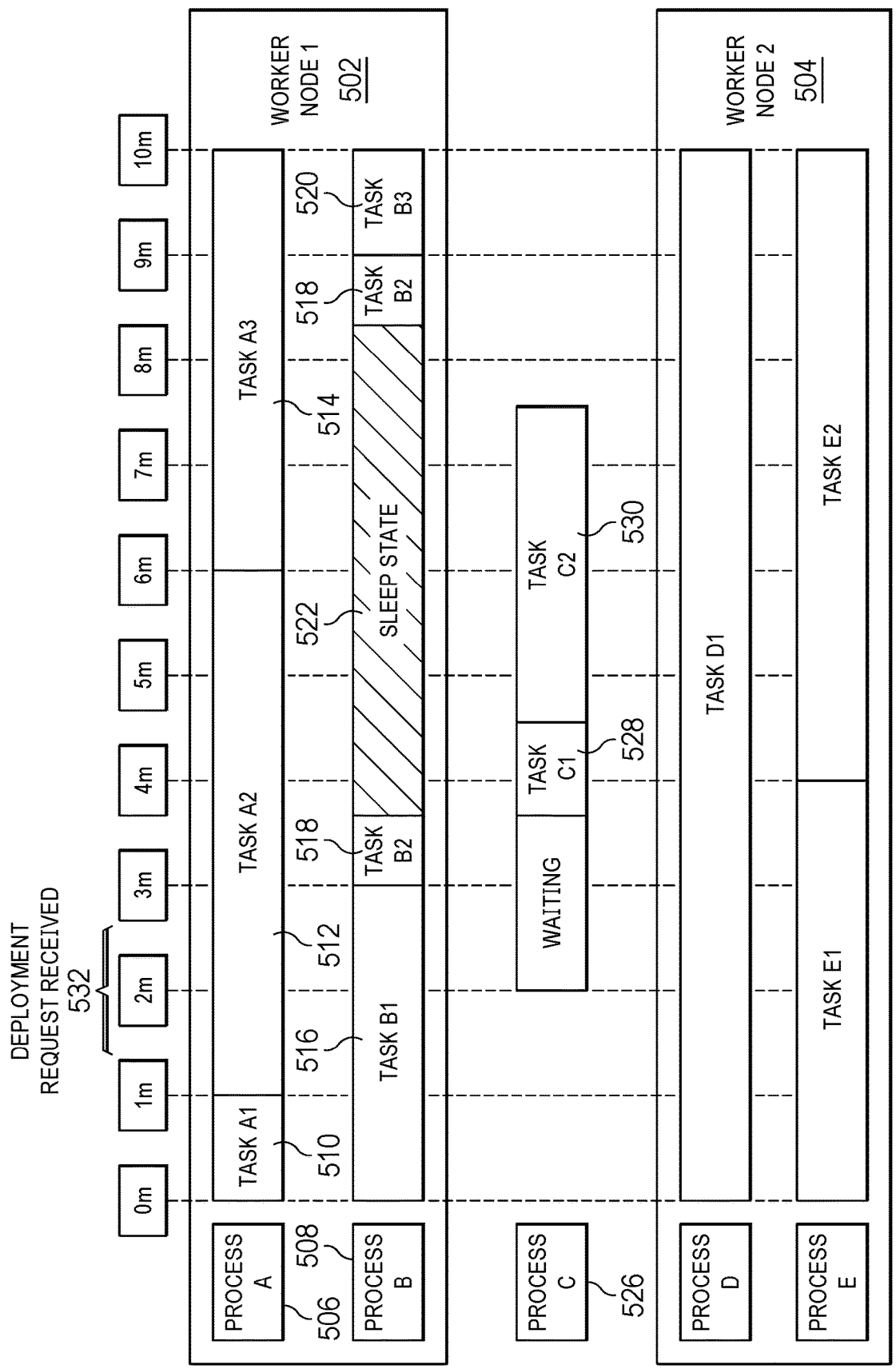

With reference now to FIGS. 5A-5B, diagrams illustrating an example of an additional process deployment request process is depicted in accordance with an illustrative embodiment. Additional process deployment request process 500 may be implemented in a serverless workflow cloud process management environment, such as, for example, serverless workflow cloud process management environment 201 in FIG. 2.

In this example, additional process deployment request process 500 includes worker node 1 502 and worker node 2 504, such as, for example, worker node 1 402 and worker node 2 404 in FIG. 4A. Worker node 1 502 includes process A 506 and process B 508, such as, for example, process A 408 and process B 410 in FIG. 4A. Process A 506 includes task A1 510, task A2 512, and task A3 514. Process B 508 includes task B1 516, task B2 518, and task B3 520. It should be noted that task B2 518, such as, for example, task B2 420 in FIG. 4A, is a sleep task, which includes sleep state 522, and its exact time duration is 6 minutes (i.e., from the minute 3 mark to the minute 9 mark in the shown timeline).

A user, such as, for example, administrative user 248 in FIG. 2, submits additional process deployment request 524 for process C 526 to a controller node using a client device, such as, for example, controller node 202 and client device 206 in FIG. 2. Process C 526 includes task C1 528 and task C2 530. The average execution time of task C1 528 and task C2 530 is 1 minute and 3 minutes, respectively. Thus, the overall average execution time of process C 526 is 4 minutes. As a result, process C 526 is capable of being run on worker node 1 502 within the 6 minute duration of sleep state 522 of task B2 518.

At 532, the controller node receives additional process deployment request 524 at the minute 2 mark of the shown timeline. 534 indicates the current process status of worker node 1 502 as of minute 2 when the deployment request was received. For example, 534 indicates that task A1 510 started at minute 0 and ended at minute 1, task A2 512 started at minute 1 and has not yet ended, task A3 514 has not started, task B1 516 started at time 0 and has not yet ended, task B2 518 has not yet started, and task B3 520 also has not yet started.

Figure 6A:
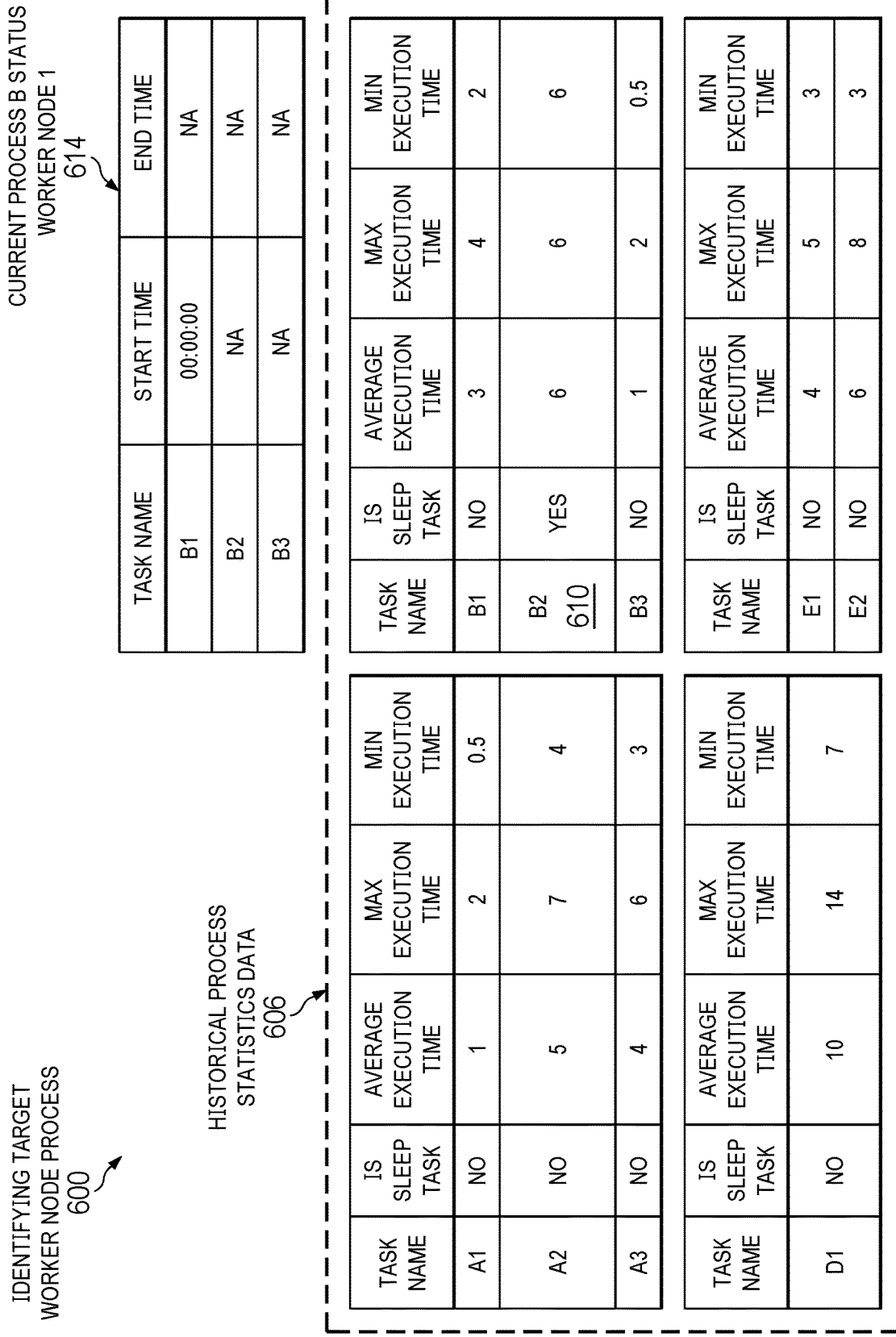
FIGS. 6A-6B are diagrams illustrating an example of identifying a target worker node in accordance with an illustrative embodiment.
Figure 6B:
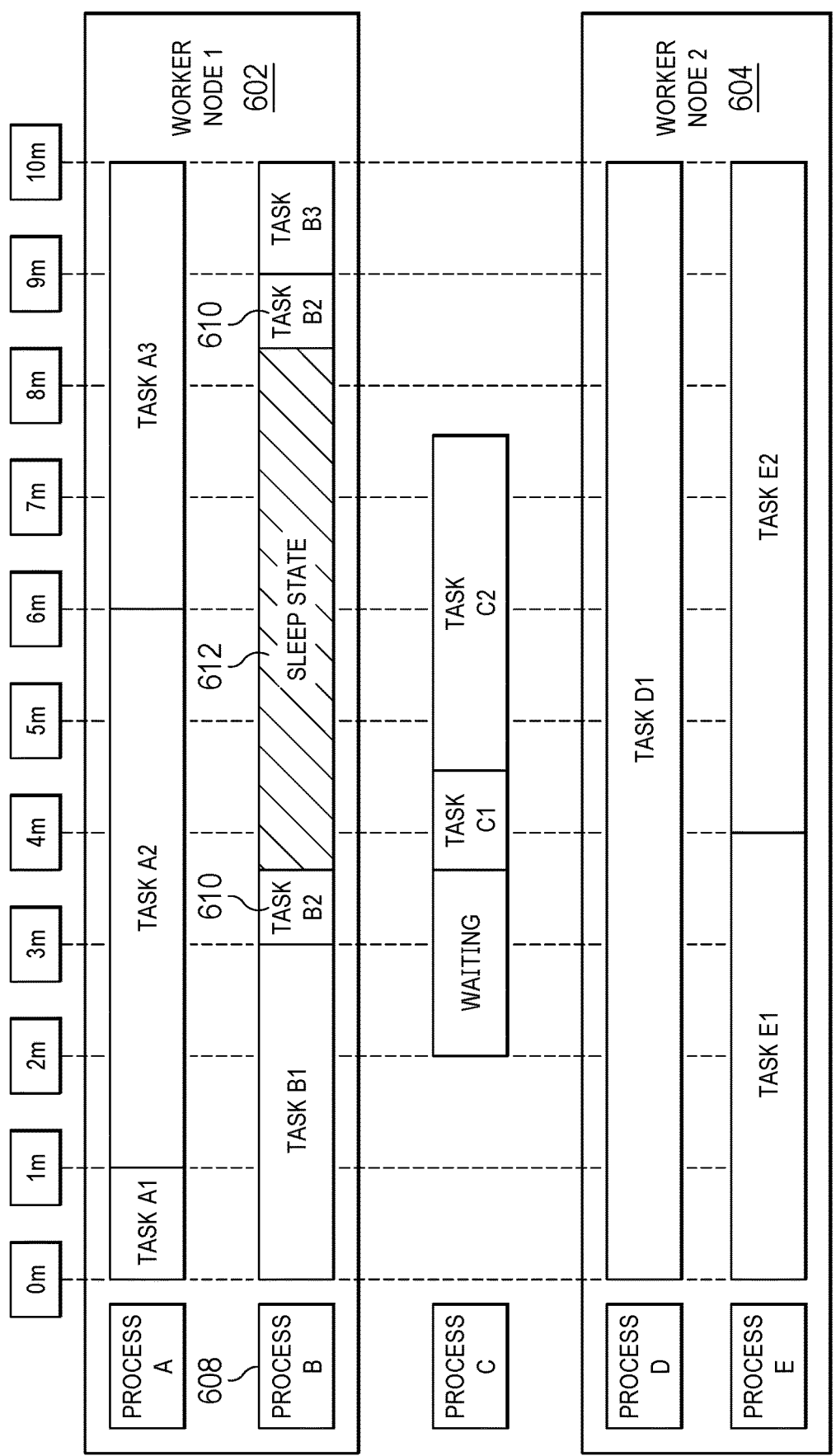

With reference now to FIGS. 6A-6B, diagrams illustrating an example of identifying a target worker node is depicted in accordance with an illustrative embodiment. Identifying target worker node process 600 may be implemented in a serverless workflow cloud process management environment, such as, for example, serverless workflow cloud process management environment 201 in FIG. 2.

In this example, identifying a target worker node process 600 includes worker node 1 602, worker node 2 604, and historical process statistics data 606. Worker node 1 602 and worker node 2 604 may be, for example, worker node 1 502 and worker node 2 504 in FIG. 5B. Historical process statistics data 606 is the same as historical process statistics data 406 in FIG. 4B, except historical process statistics data are not shown for task C1 and task C2 of process C.

Process B 608 includes task B2 610 with sleep state 612. Task B2 610 runs from the minute 3 mark to the minute 9 mark in the shown timeline. 614 indicates the current process B 608 status of worker node 1 602 as of minute 2 when a deployment request for an additional process (i.e., process C) was received. For example, 614 indicates task B1 started at time 0 and has not yet ended, task B2 has not yet started, and task B3 also has not yet started. Thus, worker node 602 is the target worker node capable of running the additional process during sleep state 612 of task B2 610.

Figure 7:
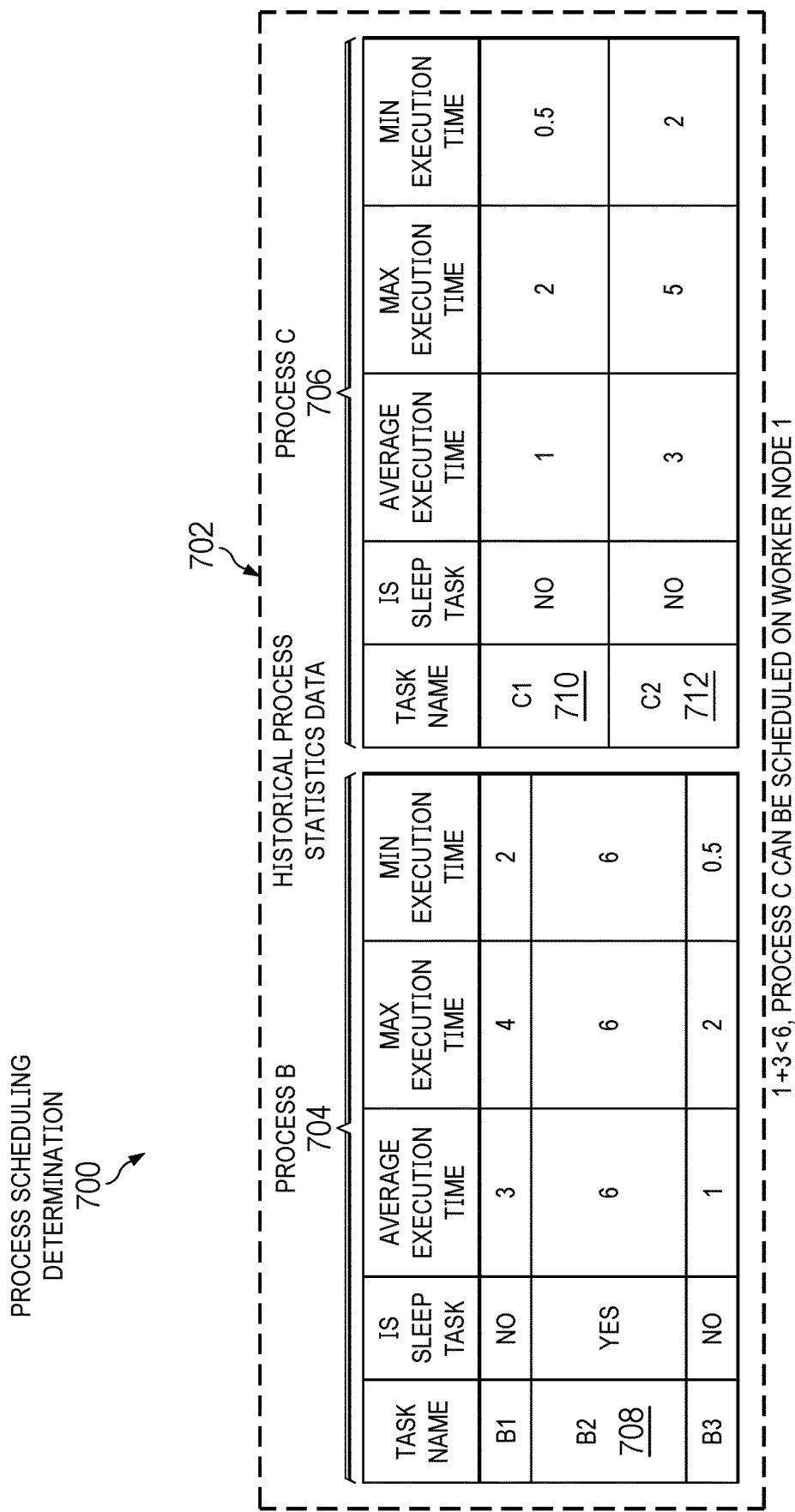
FIG. 7 is a diagram illustrating an example of a process scheduling determination in accordance with an illustrative embodiment.

With reference now to FIG. 7, a diagram illustrating an example of a process scheduling determination is depicted in accordance with an illustrative embodiment. Process scheduling determination 700 may be implemented in a process manager, such as, for example, process manager 208 in FIG. 2.

In this example, process scheduling determination 700 includes historical process statistics data 702 for process B 704 and process C 706. Process B 704 and process C 706 may be, for example, process B 508 and process C 526 in FIG. 5B. Process scheduling determination 700 calculates whether an additional process (i.e., process C 706) can be scheduled in a target worker node (e.g., worker node 1 602 in FIG. 6B) during the 6 minute sleep state of task B2 708, such as, for example sleep state 612 of task B2 610 in FIG. 6B. In other words, process scheduling determination 700 determines whether process C 706 can finish running within the 6 minute sleep state of task B2 708 based on the information in historical process statistics data 702 (i.e., average execution times) for task C1 710 and task C2 712 of process C 706. For example, the average execution time for task C1 710 is 1 minute, the average execution time for task C2 712 is 3 minutes, and the duration of task B2 with the sleep state is 6 minutes. Thus, 1+3<6. As a result, process C 706 can be scheduled to run on the target worker node (e.g., worker node 1 602 in FIG. 6B).

Figure 8:
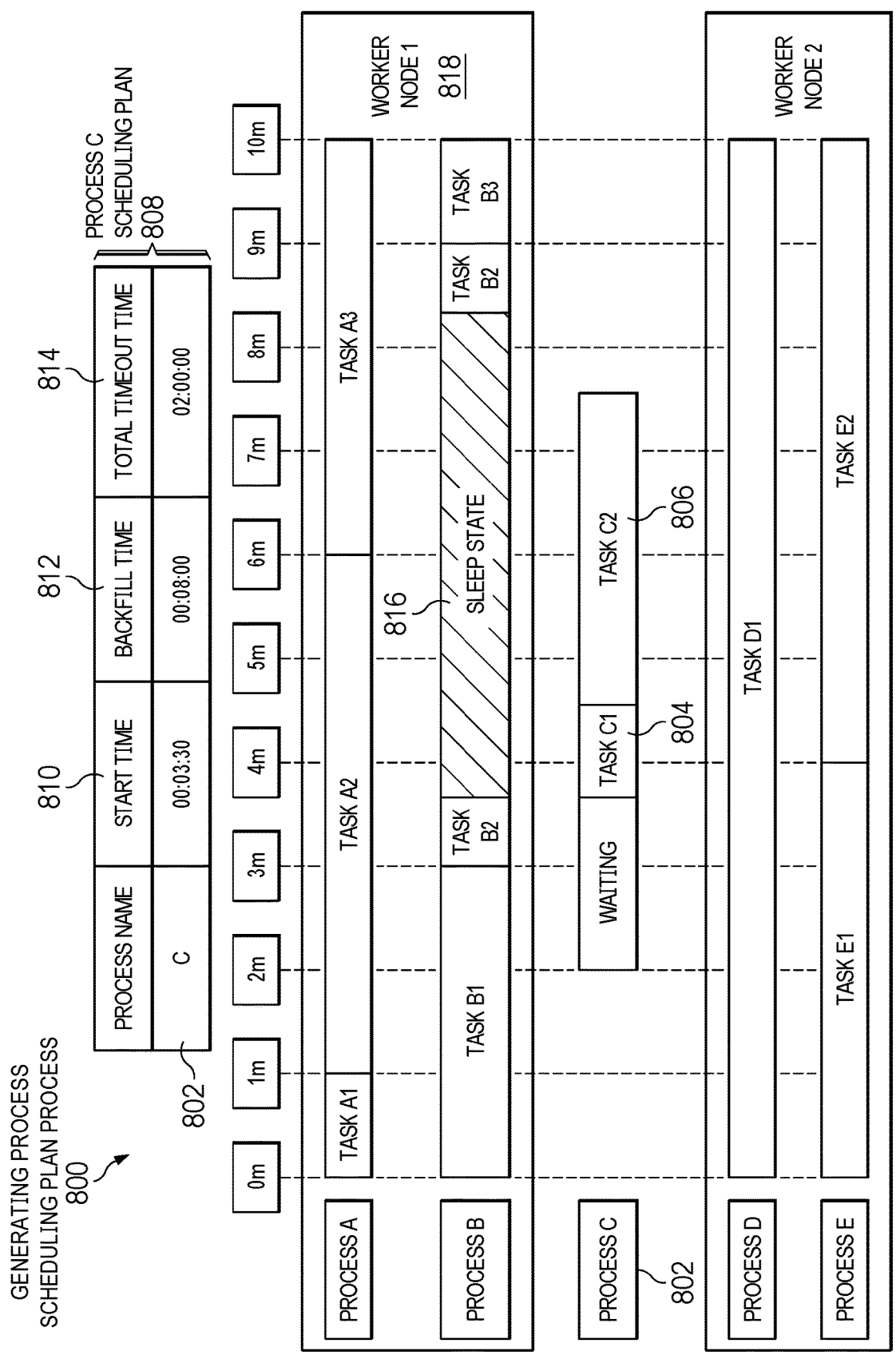
FIG. 8 is a diagram illustrating an example of generating a process scheduling plan in accordance with an illustrative embodiment.

With reference now to FIG. 8, a diagram illustrating an example of generating a process scheduling plan is depicted in accordance with an illustrative embodiment. Generating process scheduling plan process 800 may be implemented in a process manager, such as, for example, process manager 208 in FIG. 2.

The process manager utilizes a process predictor, such as, for example, process predictor 240 in FIG. 2, to generate a scheduling plan for an additional process (i.e., process C 802), which a user has requested to be deployed on a cluster of worker nodes, such as, for example, worker node cluster 204 in FIG. 2. Process C 802 may be, for example, process C 706 in FIG. 7. Process C 802 is comprised of task C1 804 and task C2 806, such as, for example, task C1 710 and task C2 712 in FIG. 7.

The process predictor generates process C scheduling plan 808 by calculating start time 810 and backfill time 812 for process C 802. For example:

additional process start time=task sleep state start time+buffer time; and additional process backfill time=(task sleep state end time−buffer time)−buffer time.

Thus, process C start time 810 is equal to 00:03:00+00:00:30. In other words, the process predictor calculates process C start time 810 to be at the minute 00:03:30 mark by adding 00:00:30, which is a predefined buffer time period, to 00:03:00, which is the start time of sleep state 816 of task B2 corresponding to process B, as indicated in the shown timeline. However, it should be noted that the buffer time period of 30 seconds is intended as an example only. In other words, the user may define the buffer time period to be of any duration based on, for example, user experience or knowledge.

In addition, process C backfill time 812 is equal to (00:09:00−00:00:30)−00:00:30. In other words, the process predictor calculates process C backfill time 812 to be at the minute 00:08:00 mark by twice subtracting the predefined buffer time period of 00:00:30 (i.e., 00:01:00) from 00:09:00, which is the end time of sleep state 816 of task B2 corresponding to process B, as indicated in the shown timeline.

In this example, process C total timeout time 814 is 02:00:00, which is a predefined time period. However, it should be noted that the total timeout time of 2 hours is intended as an example only. In other words, the user may define the total timeout time to be of any duration based on, for example, user need.

Afterward, the process predictor executes process C 802 on worker node 1 818 according to process C scheduling plan 808. Worker node 1 818 may be, for example, target worker node 1 602 in FIG. 6B. A timeout handler, such as, for example, timeout handler 244 in FIG. 2, marks deployment of process C 802 as failed when process C 802 is not scheduled and finished running within total timeout time 814.

Figure 9A:
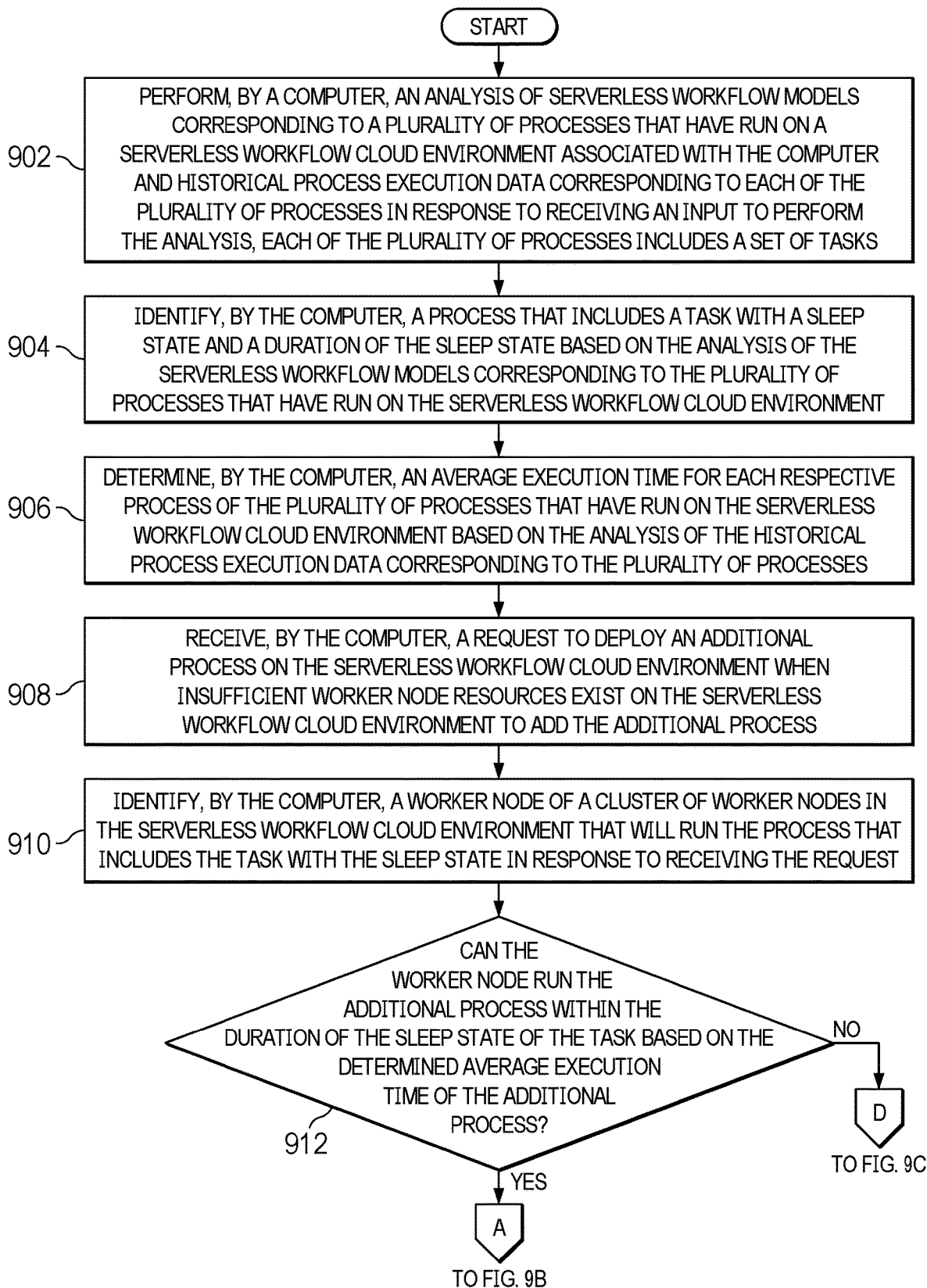
FIGS. 9A-9C are a flowchart illustrating a process for intelligent process management in accordance with an illustrative embodiment.
Figure 9B:
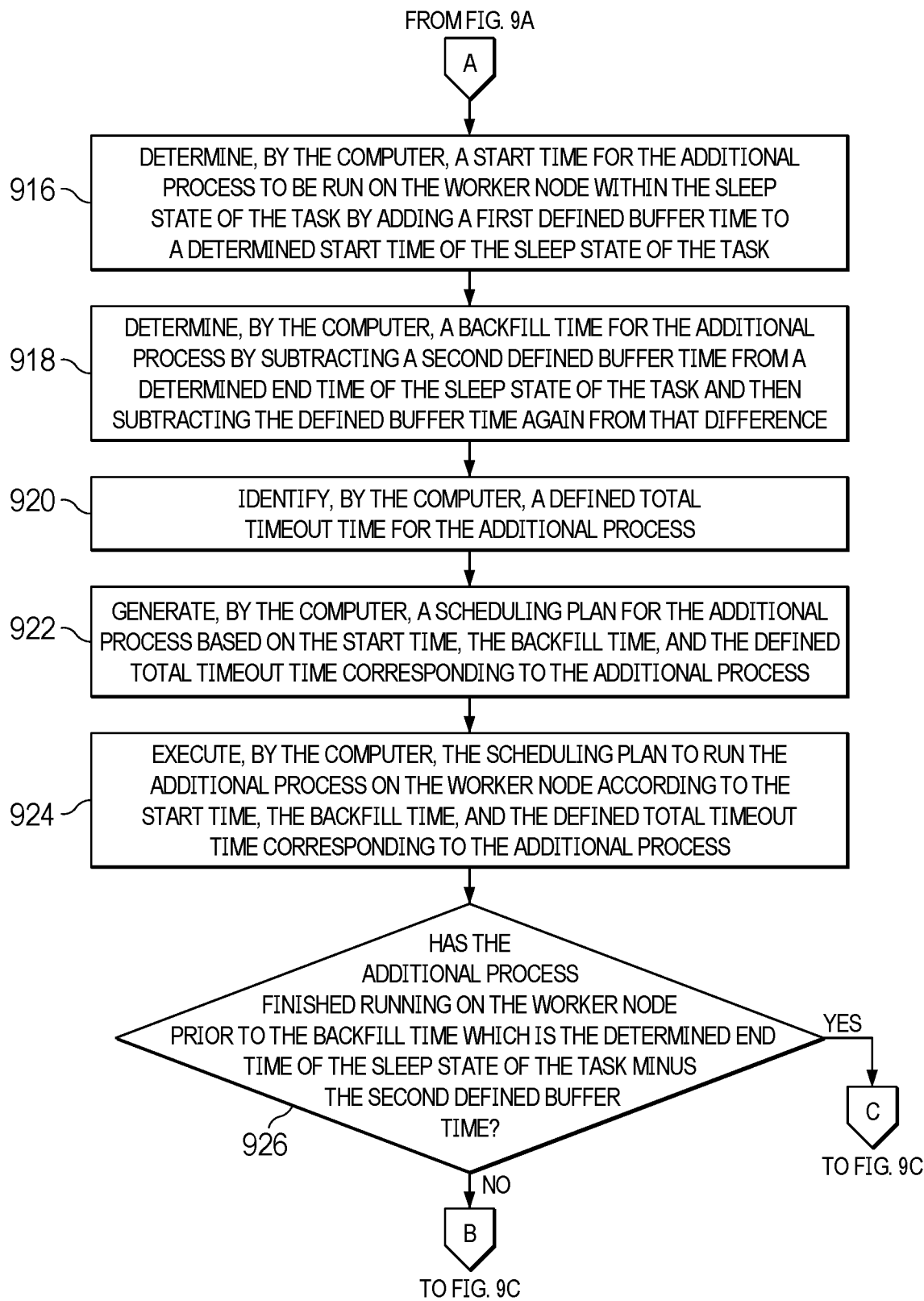
Figure 9C:
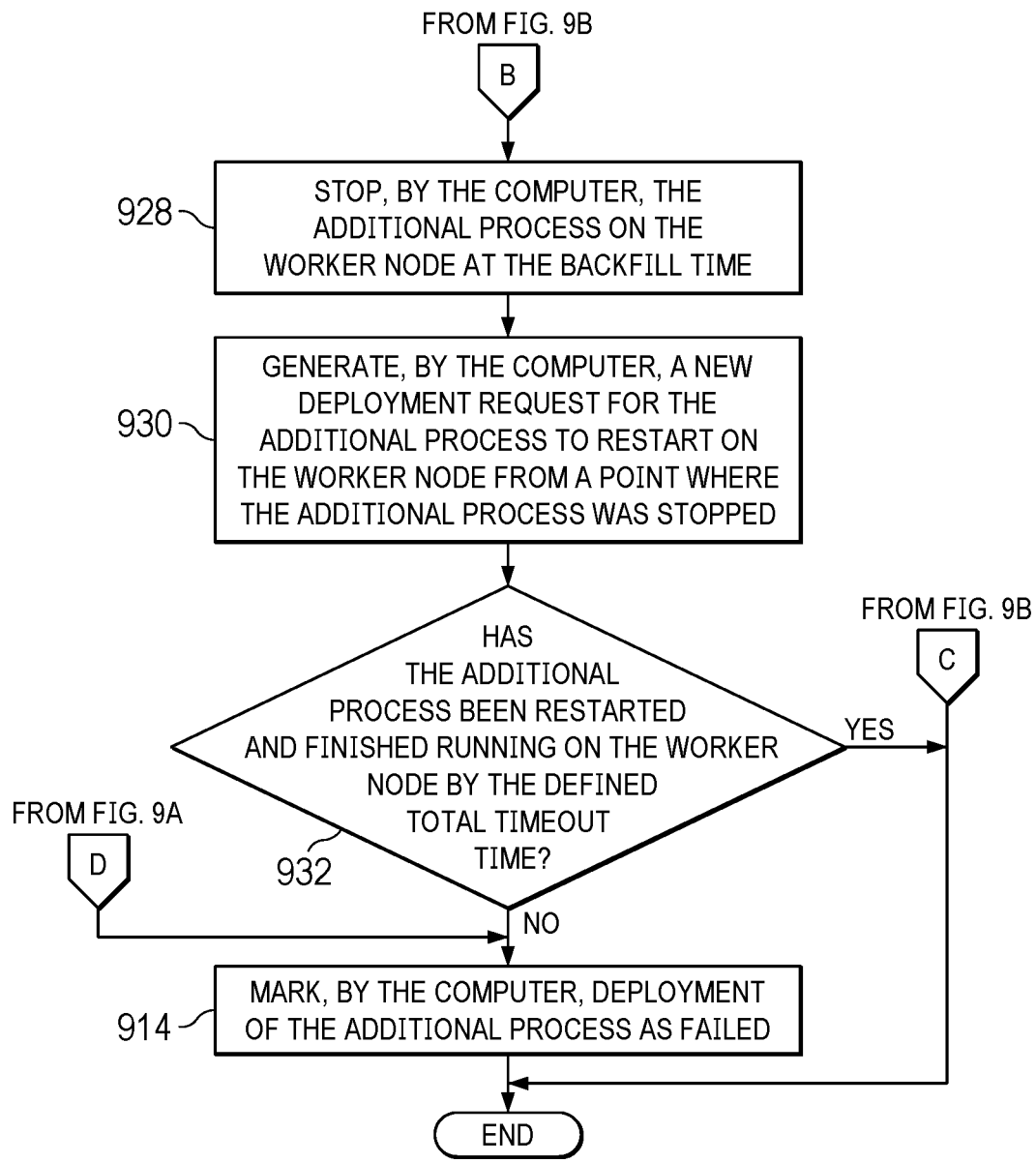

With reference now to FIGS. 9A-9C, a flowchart illustrating a process for intelligent process management is shown in accordance with an illustrative embodiment. The process shown in FIGS. 9A-9C may be implemented in a computer, such as, for example, computer 101 in FIG. 1 or controller node 202 in FIG. 2. For example, the process shown in FIGS. 9A-9C may be implemented in process management code 200 in FIG. 1 or process manager 208 in FIG. 2.

The process begins when the computer performs an analysis of serverless workflow models corresponding to a plurality of processes that have run on a serverless workflow cloud environment associated with the computer and historical process execution data corresponding to each of the plurality of processes in response to receiving an input to perform the analysis (step 902). Each respective process of the plurality of processes includes a set of tasks. The serverless workflow cloud environment may be, for example, serverless workflow cloud process management environment 201 in FIG. 2.

The computer identifies a process that includes a task with a sleep state and a duration of the sleep state based on the analysis of the serverless workflow models corresponding to the plurality of processes that have run on the serverless workflow cloud environment (step 904). In addition, the computer determines an average execution time for each respective process of the plurality of processes that have run on the serverless workflow cloud environment based on the analysis of the historical process execution data corresponding to the plurality of processes (step 906).

The computer receives a request to deploy an additional process on the serverless workflow cloud environment when insufficient worker node resources exist on the serverless workflow cloud environment to add the additional process (step 908). The computer identifies a worker node of a cluster of worker nodes in the serverless workflow cloud environment that will run the process that includes the task with the sleep state in response to receiving the request to deploy the additional process (step 910). Afterward, the computer makes a determination as to whether the worker node can run the additional process within the duration of the sleep state of the task based on the determined average execution time of the additional process (step 912).

If the computer determines that the worker node cannot run the additional process within the duration of the sleep state of the task based on the determined average execution time of the additional process, no output of step 912, then the computer marks deployment of the additional process as failed (step 914). Thereafter, the process terminates. If the computer determines that the worker node can run the additional process within the duration of the sleep state of the task based on the determined average execution time of the additional process, yes output of step 912, then the computer determines a start time for the additional process to be run on the worker node within the duration of the sleep state of the task of the process already running on the worker node by adding a first defined buffer time to a determined start time of the sleep state of the task (step 916). Further, the computer determines a backfill time for the additional process by subtracting a second defined buffer time from a determined end time of the sleep state of the task (step 918). The second defined buffer time may be, for example, the first defined buffer time times two (i.e., first defined buffer time+first defined buffer time=second defined buffer time). However, the user may set the second defined buffer time to be any amount of buffer time, such as, for example, the first defined buffer time X 0.5, the first defined buffer time X 1.0, the first defined buffer time X 1.25, the first defined buffer time X 1.5, the first defined buffer time X 1.75, the first defined buffer time X 2.0, the first defined buffer time X 2.5, the first defined buffer time X 3.0, or the like. Furthermore, the computer identifies a defined total timeout time for the additional process (step 920).

The computer generates a scheduling plan for the additional process based on the start time, the backfill time, and the defined total timeout time corresponding to the additional process (step 922). The computer executes the scheduling plan to run the additional process on the worker node according to the start time, the backfill time, and the defined total timeout time corresponding to the additional process (step 924).

Subsequently, the computer makes a determination as to whether the additional process finished running on the worker node prior to the backfill time which is the determined end time of the sleep state of the task minus the second defined buffer time (step 926). If the computer determines that the additional process has finished running on the worker node prior to the backfill time, yes output of step 926, then the process terminates thereafter. If the computer determines that the additional process has not finished running on the worker node prior to the backfill time, no output of step 926, then the computer stops the additional process on the worker node at the backfill time (step 928). The computer stops the additional process to release the work node resources to ensure that the process, which includes the task with the sleep state, can wake up from the sleep state in time to run on the worker node without error. In addition, the computer generates a new deployment request for the additional process to restart on the worker node from a point where the additional process was stopped (step 930). In other words, the execution context of the additional process is persisted so that the additional process can restart from where the additional process last stopped.

Afterward, the computer makes a determination as to whether the additional process has been restarted and finished running on the worker node by the defined total timeout time (step 932). If the computer determines that the additional process has been restarted and finished running on the worker node by the defined total timeout time, yes output of step 932, then the process terminates thereafter. If the computer determines that the additional process has not been restarted and finished running on the worker node by the defined total timeout time, no output of step 932, then the process returns to step 914 where the computer marks the deployment of the additional process as failed for lack of available worker node resources.

Thus, illustrative embodiments of the present invention provide a computer-implemented method, computer system, and computer program product for performing intelligent management of processes in a serverless workflow cloud environment when insufficient worker node resources exist to deploy an additional process on the serverless workflow cloud environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for intelligent process management, the computer-implemented method comprising:

determining, by a computer, a start time for an additional process to be run on a worker node within a duration of a sleep state of a task of a process already running on the worker node by adding a first defined buffer time to a determined start time of the sleep state of the task;

determining, by the computer, a backfill time for the additional process by subtracting a second defined buffer time from a determined end time of the sleep state of the task;

generating, by the computer, a scheduling plan for the additional process based on the start time and the backfill time corresponding to the additional process;

executing, by the computer, the scheduling plan to run the additional process on the worker node according to the start time and the backfill time corresponding to the additional process;

determining, by the computer, whether the additional process finished running on the worker node prior to the backfill time which is the determined end time of the sleep state of the task minus the second defined buffer time; and responsive to the computer determining that the additional process has not finished running on the worker node prior to the backfill time, stopping, by the computer, the additional process on the worker node at the backfill time.

2. The computer-implemented method of claim 1, wherein the computer stops the additional process to release resources of the work node to ensure that the process, which includes the task with the sleep state, can wake up from the sleep state in time to run on the worker node without error.

3. The computer-implemented method of claim 1 further comprising:
generating, by the computer, a new deployment request for the additional process to restart on the worker node from a point where the additional process was stopped.

4. The computer-implemented method of claim 3 further comprising:
determining, by the computer, whether the additional process has been restarted and finished running on the worker node by a defined total timeout time; and
responsive to the computer determining that the additional process has not been restarted and finished running on the worker node by the defined total timeout time, marking, by the computer, deployment of the additional process as failed.

5. The computer-implemented method of claim 1 further comprising:
performing, by the computer, an analysis of serverless workflow models corresponding to a plurality of processes that have run on a serverless workflow cloud environment associated with the computer and historical process execution data corresponding to each of the plurality of processes, each respective process of the plurality of processes includes a set of tasks.

6. The computer-implemented method of claim 5 further comprising:
identifying, by the computer, the process that includes the task with the sleep state and the duration of the sleep state based on the analysis of the serverless workflow models corresponding to the plurality of processes that have run on the serverless workflow cloud environment; and
determining, by the computer, an average execution time for each respective process of the plurality of processes that have run on the serverless workflow cloud environment based on the analysis of the historical process execution data corresponding to the plurality of processes.

7. The computer-implemented method of claim 1 further comprising:
receiving, by the computer, a request to deploy the additional process on a serverless workflow cloud environment when insufficient worker node resources exist on the serverless workflow cloud environment to add the additional process.

8. The computer-implemented method of claim 7 further comprising:
identifying, by the computer, the worker node of a cluster of worker nodes in the serverless workflow cloud environment that will run the process that includes the task with the sleep state in response to receiving the request to deploy the additional process; and
determining, by the computer, whether the worker node can run the additional process within the duration of the sleep state of the task based on a determined average execution time of the additional process.

9. The computer-implemented method of claim 8 further comprising:

responsive to the computer determining that the worker node cannot run the additional process within the duration of the sleep state of the task based on the determined average execution time of the additional process, marking, by the computer, deployment of the additional process as failed.

10. The computer-implemented method of claim 8 further comprising:
responsive to the computer determining that the worker node can run the additional process within the duration of the sleep state of the task based on the determined average execution time of the additional process, determining, by the computer, the start time for the additional process to be run on the worker node within the duration of the sleep state of the task of the process already running on the worker node.

11. A computer system for intelligent process management, the computer system comprising:
a communication fabric;
a storage device connected to the communication fabric, wherein the storage device stores program instructions; and
a processor connected to the communication fabric, wherein the processor executes the program instructions to:
determine a start time for an additional process to be run on a worker node within a duration of a sleep state of a task of a process already running on the worker node by adding a first defined buffer time to a determined start time of the sleep state of the task;
determine a backfill time for the additional process by subtracting a second defined buffer time from a determined end time of the sleep state of the task;
generate a scheduling plan for the additional process based on the start time and the backfill time corresponding to the additional process;
execute the scheduling plan to run the additional process on the worker node according to the start time and the backfill time corresponding to the additional process;
determine whether the additional process finished running on the worker node prior to the backfill time which is the determined end time of the sleep state of the task minus the second defined buffer time; and
stop the additional process on the worker node at the backfill time in response to determining that the additional process has not finished running on the worker node prior to the backfill time.

12. The computer system of claim 2, wherein the processor stops the additional process to release resources of the work node to ensure that the process, which includes the task with the sleep state, can wake up from the sleep state in time to run on the worker node without error.

13. The computer system of claim 2, wherein the processor further executes the program instructions to:
generate a new deployment request for the additional process to restart on the worker node from a point where the additional process was stopped.

14. A computer program product for intelligent process management, the computer program product comprising a computer-readable storage medium having program instructions embodied therewith, the program instructions executable by a computer to cause the computer to perform a method of:
determining, by the computer, a start time for an additional process to be run on a worker node within a duration of a sleep state of a task of a process already running on the worker node by adding a first defined buffer time to a determined start time of the sleep state of the task;

determining, by the computer, a backfill time for the additional process by subtracting a second defined buffer time from a determined end time of the sleep state of the task;

generating, by the computer, a scheduling plan for the additional process based on the start time and the backfill time corresponding to the additional process;

executing, by the computer, the scheduling plan to run the addition al process on the worker node according to the start time and the backfill time corresponding to the additional process;

determining, by the computer, whether the additional process finished running on the worker node prior to the backfill time which is the determined end time of the sleep state of the task minus the second defined buffer time; and responsive to the computer determining that the additional process has not finished running on the worker node prior to the backfill time, stopping, by the computer, the additional process on the worker node at the backfill time.

15. The computer program product of claim 14, wherein the computer stops the additional process to release resources of the work node to ensure that the process, which includes the task with the sleep state, can wake up from the sleep state in time to run on the worker node without error.

16. The computer program product of claim 14 further comprising:

generating, by the computer, a new deployment request for the additional process to restart on the worker node from a point where the additional process was stopped.

17. The computer program product of claim 16 further comprising:

determining, by the computer, whether the additional process has been restarted and finished running on the worker node by a defined total timeout time; and responsive to the computer determining that the additional process has not been restarted and finished running on the worker node by the defined total timeout time, marking, by the computer, deployment of the additional process as failed.

* * * * *